United States Patent
Yokose et al.

(10) Patent No.: US 7,382,294 B2
(45) Date of Patent: Jun. 3, 2008

(54) CODING APPARATUS, DECODING APPARATUS, CODING METHOD, DECODING METHOD, COMPUTER READABLE MEDIUM AND COMPUTER DATA SIGNAL

(75) Inventors: Taro Yokose, Kanagawa (JP); Masao Morita, Kanagawa (JP); Tomoki Taniguchi, Kanagawa (JP)

(73) Assignee: Fuji Xerox Co., Ltd, Tokyo (JP)

( * ) Notice: Subject to any disclaimer, the term of this patent is extended or adjusted under 35 U.S.C. 154(b) by 1 day.

(21) Appl. No.: 11/519,947

(22) Filed: Sep. 13, 2006

(65) Prior Publication Data
US 2007/0188356 A1    Aug. 16, 2007

(30) Foreign Application Priority Data
Feb. 10, 2006    (JP)    ............................ 2006-033938

(51) Int. Cl.
*H03M 7/32*    (2006.01)
*H04N 7/42*    (2006.01)

(52) U.S. Cl. .................... 341/76; 341/67; 341/107; 375/240.12; 382/238

(58) Field of Classification Search ............. 341/51, 341/65, 67, 76, 77; 375/240.12; 382/238, 382/244, 245, 246, 247
See application file for complete search history.

(56) References Cited

U.S. PATENT DOCUMENTS 7,272,182 B1 *    9/2007   Nakagawa et al. .... 375/240.12
2003/0194140 A1 *   10/2003   Kimura et al. .............. 382/238

FOREIGN PATENT DOCUMENTS

| JP | A-09-135357 | 5/1997 |
| JP | A 2000-217003 | 8/2000 |

* cited by examiner

*Primary Examiner*—Howard Williams
(74) *Attorney, Agent, or Firm*—Oliff & Berridge, PLC

(57) ABSTRACT

A coding apparatus includes a predicting unit, an intermediate-code generating unit, a first coding unit and a second coding unit. The predicting unit generates a piece of prediction data based on each piece of pixel data constituting a color image. The intermediate-code generating unit compares each piece of prediction data with the corresponding piece of pixel data, to generate an intermediate code in accordance with whether or not a difference between each piece of prediction data and the corresponding piece of pixel data is in a predetermined range. The first coding unit performs entropy coding on the generated intermediate code. The second coding unit performs entropy coding on the generated intermediate code. The intermediate-code generating unit assigns each generated intermediate code to either of the first and second coding units according to whether or not the difference is in the predetermined range.

12 Claims, 14 Drawing Sheets

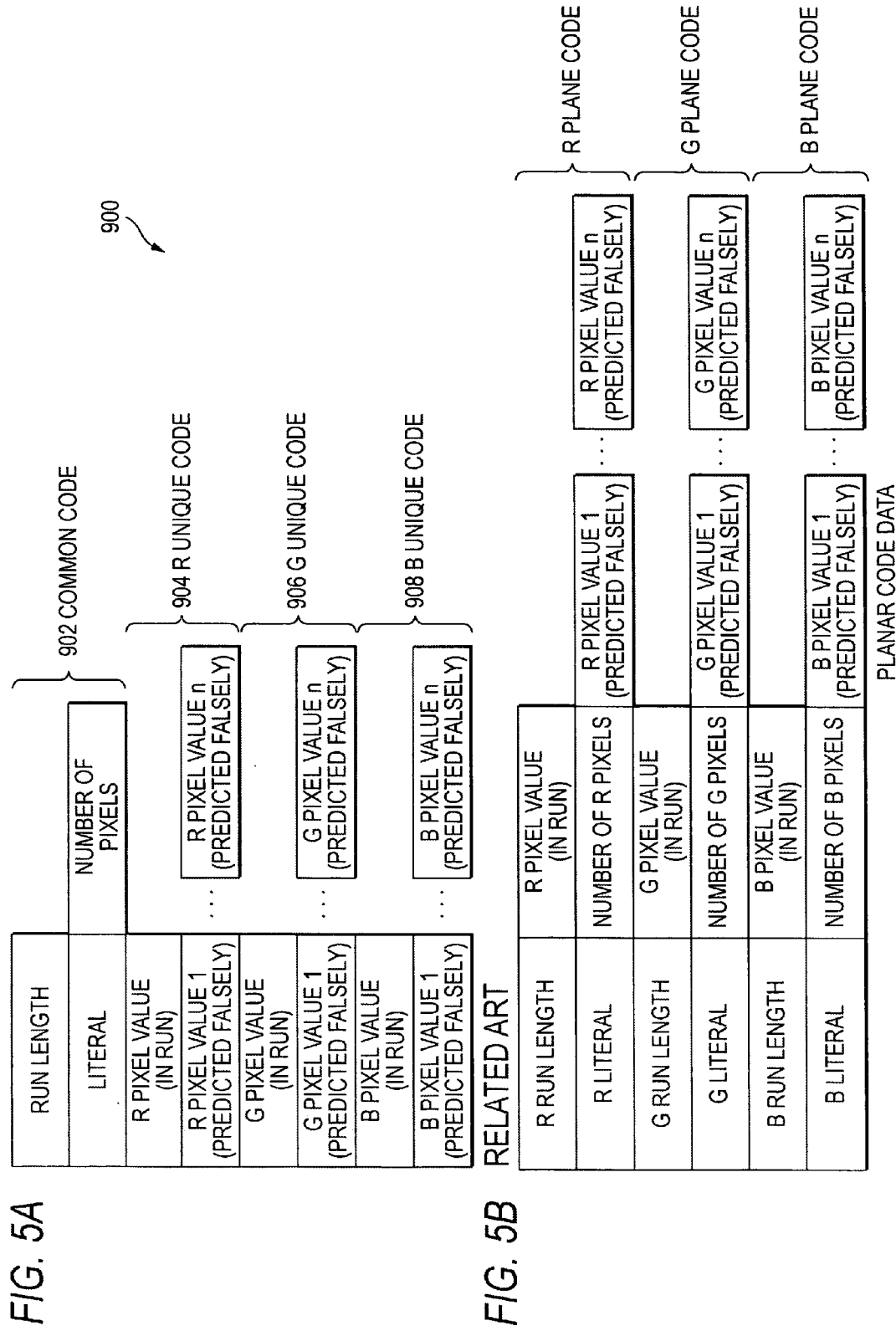

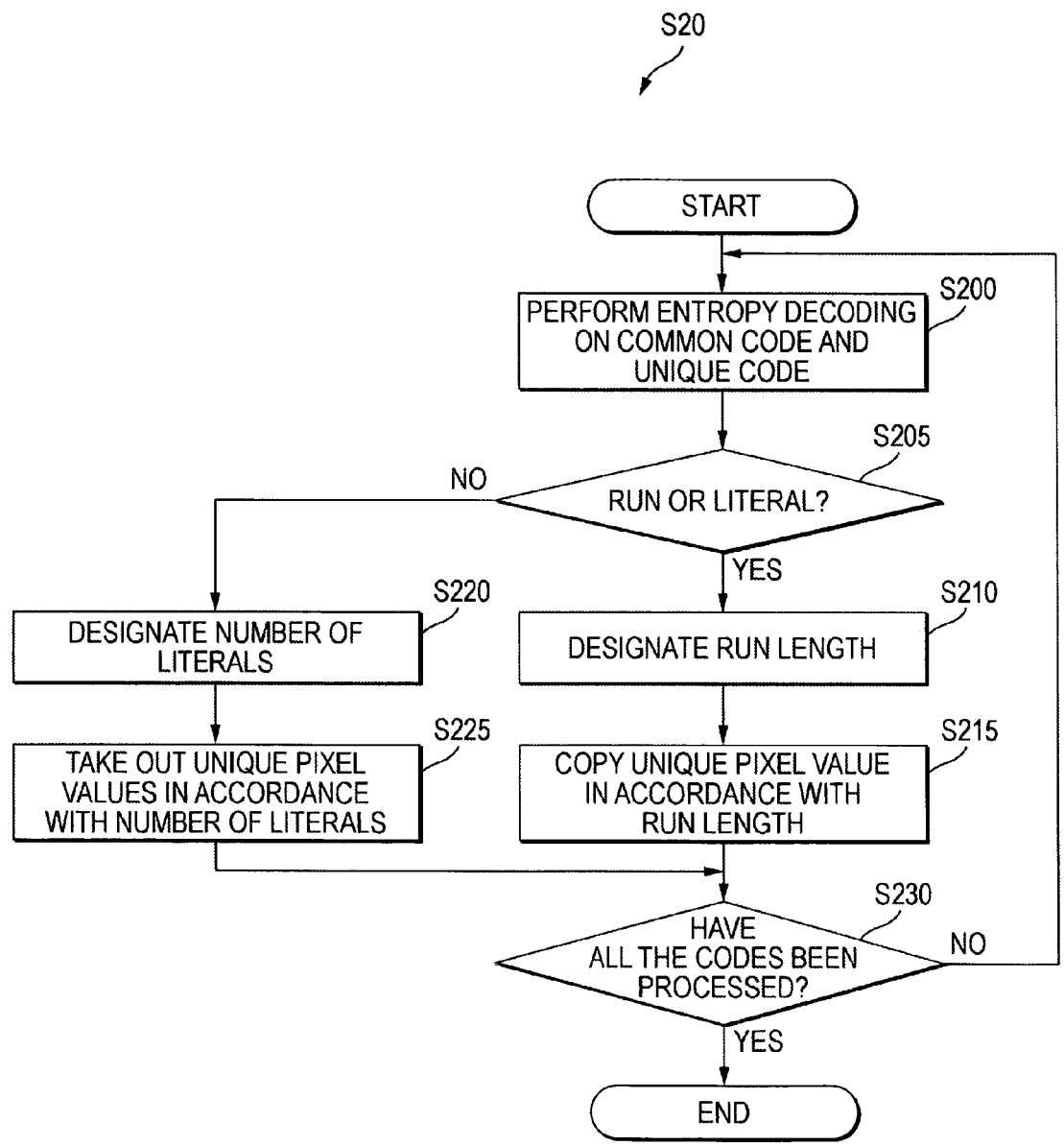

REFERENCE PIXELS
OF PREDICTORS

| PREDICTOR | CODE |
|---|---|
| A | CODE A |
| B | CODE B |
| C | CODE C |
| D | CODE D |

CODES CORRESPONDING TO PREDICTORS

| CODE B | NUMBER IN RUN (2) | CODE A | PREDICTION ERROR | CODE A | NUMBER IN RUN (5) | ... |

EXAMPLE OF CODE DATA

PLANAR CODE DATA

CHUNKY CODE DATA

CODING APPARATUS, DECODING APPARATUS, CODING METHOD, DECODING METHOD, COMPUTER READABLE MEDIUM AND COMPUTER DATA SIGNAL

BACKGROUND

1. Technical Field

The invention relates to a coding apparatus for coding image data of a color image.

2. Related Art

For example, a coding process in which plural coders perform parallel processing while an input image is assigned equally to the plural coders is known.

SUMMARY

According to an aspect of the invention, a coding apparatus includes a predicting unit, an intermediate-code generating unit, a first coding unit and a second coding unit. The predicting unit generates a piece of prediction data based on each piece of pixel data constituting a color image. The intermediate-code generating unit compares each piece of prediction data with the corresponding piece of pixel data, to generate an intermediate code in accordance with whether or not a difference between each piece of prediction data and the corresponding piece of pixel data is in a range. The first coding unit performs entropy coding on the intermediate code generated by the intermediate-code generating unit. The second coding unit performs entropy coding on the intermediate code generated by the intermediate-code generating unit. The intermediate-code generating unit assigns each generated intermediate code to either of the first and second coding units in accordance with whether or not the difference between the corresponding piece of prediction data and the corresponding piece of pixel data is in the range.

BRIEF DESCRIPTION OF THE DRAWINGS

Exemplary embodiments of the invention will be described in detail based on the following figures, wherein:

FIG. 5A is a view for explaining code data 900 generated by the coding process (S10), and FIG. 5B is a view for explaining code data obtained by coding respective color components simply by a run-length coding system;

FIG. 7 is a flow chart of a decoding process (S20) to be performed by the decoding program 6 (FIG. 6);

DETAILED DESCRIPTION

Background and Outline

A process of coding a color image is roughly classified into a pixel-interleave coding process and a plane-interleave coding process. The pixel-interleave coding process has a coding format in which color components are collected in accordance with each pixel whereas the plane-interleave coding process has a coding format in which an image is formed in accordance with each color component.

For a general process, it is easy to use a dot sequence in which pixel data constituting a partial image is localized. The pixel data means data concerned with each pixel. For example, the pixel data includes plural color component values.

On the other hand, for a device such as printer for printing color by color, it is necessary to use a plane interleave manner.

The plane-interleave coding process has the following two problems, as compared with the pixel-interleave coding process.

The first problem is that processing time is long. That is, processing time depends on the coding system. When plane-interleave coding is performed in a coding system in which the processing time is proportional to the number of pixels, the processing time however increases because of increase in the number of pixels due to the number of colors.

The second problem is that code quantity is large. That is, when plane-interleave coding is performed, it is necessary to hold information for each plane individually even in the case where the information is redundant among plural planes (colors). This causes a tendency toward increase in the code quantity. If the plural planes can be made not correlated with each other at all, there does not occur such increase in the code quantity. In an ordinary image, color components however correlate with each other.

The coding process for image data is often achieved by a combination of a source coder for converting the image data into intermediate codes and an entropy coder for converting the intermediate codes into code data.

Therefore, an image processing apparatus 2 according to an embodiment of the invention solves the first problem chiefly by including a source coder for performing dot-sequential processing, and entropy coders provided posterior to the source coder for performing parallel processing. The image processing apparatus 2 solves the second problem chiefly by performing coding while separating the image data into information common to respective planes and individual information unique to the respective planes.

Hardware Configuration

Next, the hardware configuration of the image processing apparatus 2 according to the exemplary embodiment will be described.

Figure 1:
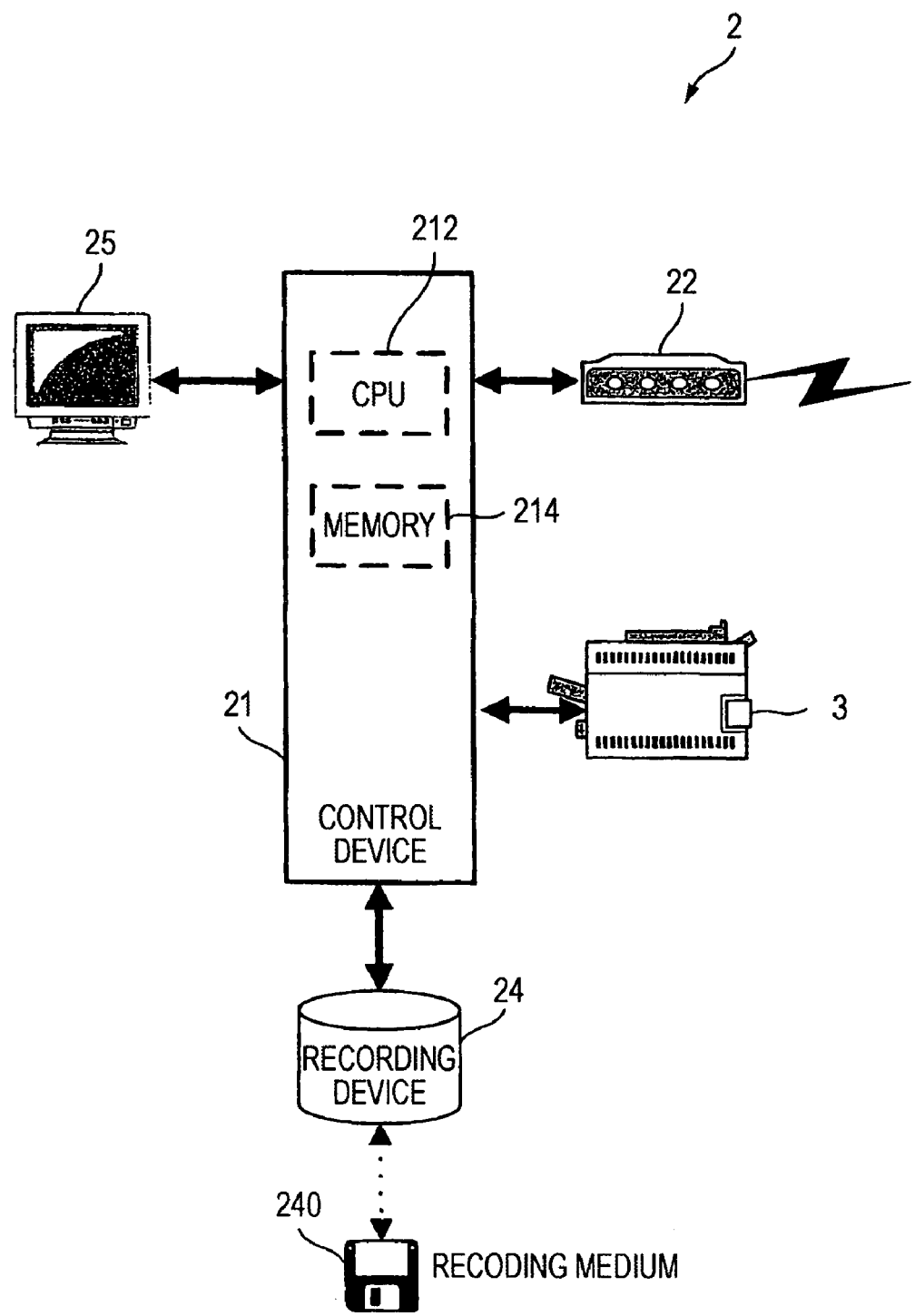
FIG. 1 is a view showing the hardware configuration of an image processing apparatus 2 which has a control device 21 as a chief topic and to which a coding method and a decoding method according to an exemplary embodiment of the invention are applied.

FIG. 1 is a view showing the hardware configuration of the image processing apparatus 2 which has a control device 21 as a chief topic and to which a coding method and a decoding method according to the exemplary embodiment of the invention are applied.

As shown in FIG. 1, the image processing apparatus 2 has the control device 21, a communication device 22, a recording device 24, and a user interface device (UI device) 25. The control device 21 includes a CPU 212, and a memory 214. The recording device 24 includes an HDD, and a CD device. The UI device 25 includes an LCD or CRT display device, a keyboard, and a touch panel.

The image processing apparatus 2 is a processing unit provided, for example, in the inside of a printer apparatus 3. A coding program 5 and a decoding program 6 according to the exemplary embodiment of the invention (as will be described later) are installed in the image processing apparatus 2. Incidentally, in the example, the image processing apparatus 2 will be described in the form of programs. The whole or part of the coding program 5 and the decoding program 6 may be achieved by hardware such as an ASIC.

Coding Program

Figure 2:
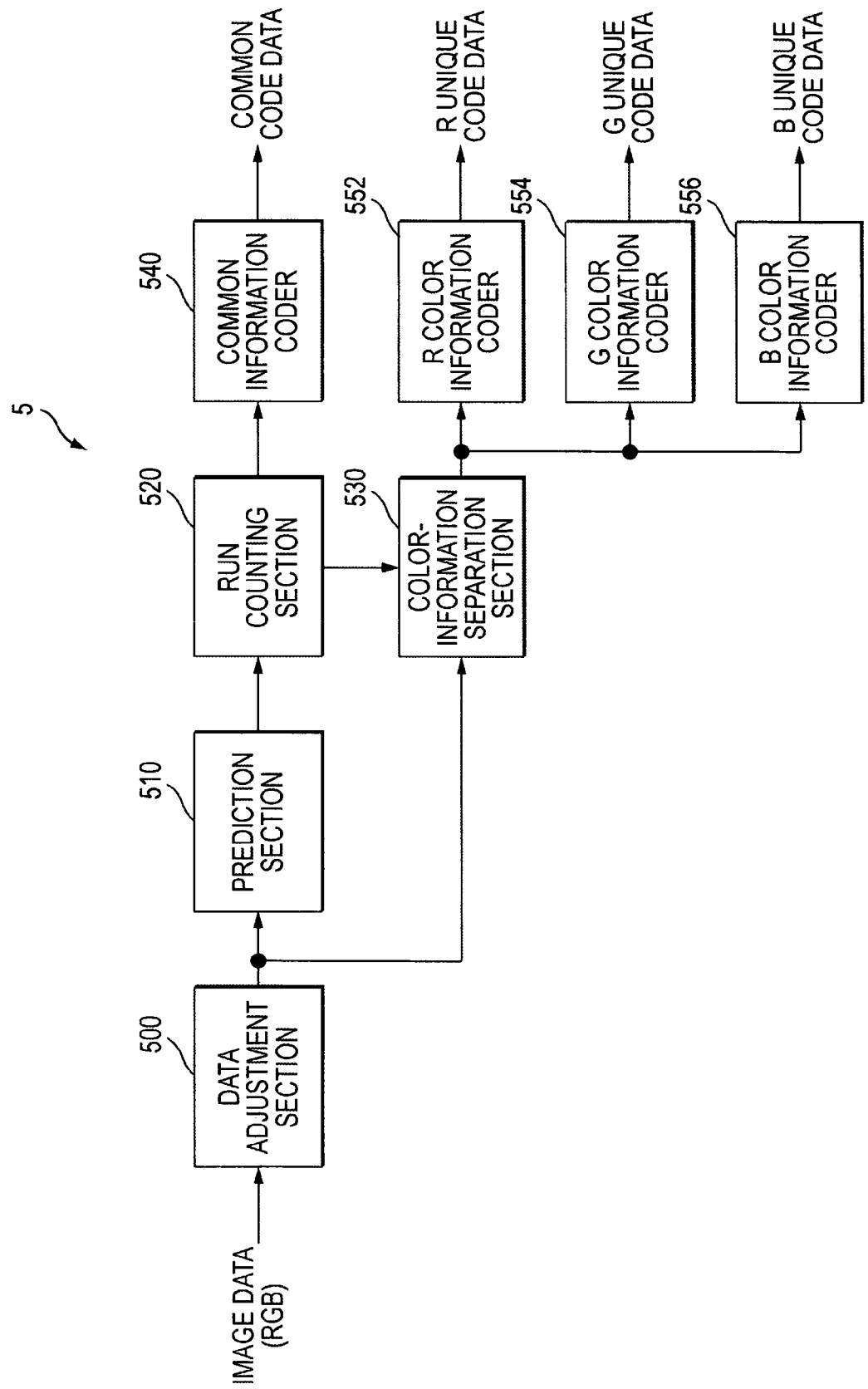
FIG. 2 a block diagram showing the functional configuration of a first coding program 5 executed by the control device 21 (FIG. 1) to achieve the coding method according to the exemplary embodiment of the invention.

FIG. 2 a block diagram showing the functional configuration of a first coding program 5 executed by the control device 21 (FIG. 1) to achieve the coding method according to the exemplary embodiment of the invention.

As shown in FIG. 2, the first coding program 5 has a data adjustment section 500, a prediction section 510, a run counting section 520, a color-information separation section 530, a common-information coder 540, and a unique-information coder. The unique-information coder includes an R color information coder 552, a G color information coder 554, and a B color information coder 556. Incidentally, the prediction section 510, the run counting section 520 and the color-information separation section 530 are equivalent to a source coder. The common-information coder 540 and the unique-information coder (i.e. the R color information coder 552, the G color information coder 554 and the B color information coder 556) are equivalent to an entropy coder.

In the coding program 5, the data adjustment section 500 converts input image data into pieces of pixel data as units to be processed in the prediction section 510.

When, for example, the input image data is classified in accordance with color components, the data adjustment section 500 generates pieces of pixel data by collecting the respective color component values.

In this example, the data adjustment section 500 limits each R value, each G value and each B value of the input RGB image to 3 bits, 3 bits and 2 bits respectively as a limited color. The data adjustment section 500 generates 8-bit pixel data by arranging the R, G and B values of the limited color. The data adjustment section 500 then outputs the generated pixel data to the prediction section 510 and the color-information separation section 530.

The prediction section 510 generates prediction data of a pixel in question, which is a processing target, by a given prediction method, compares the generated prediction data with pixel data of the pixel in question, and outputs a result of the comparison (as to whether a difference between the prediction data and the pixel data is in a predetermined range or not) to the run counting section 520. The predetermined range is information for defining irreversibility in the coding process. As the range becomes wider, the irreversibility becomes so higher that a higher compression ratio can be obtained.

Since a run-length coding system is employed in this example, the prediction section 510 reads pixel data (8 bits) of a preceding pixel as prediction data, compares the prediction data with pixel data of a pixel in question, and outputs, to the run counting section 520, a result of the comparison as to whether these two pieces of data coincide with each other or not.

The run counting section 520 counts up a consecutive number (run) by which one and the same pixel data repeats consecutively, on the basis of the comparison result input from the prediction section 510. The run counting section 520 gives the color-information separation section 530 a notice of the comparison result input from the prediction section 510.

The run counting section 520 in this example counts up a count value of the run when a message indicating coincidence of the two pieces of data is input from the prediction section 510. The run counting section 520 outputs the count value counted so far as the run to the common-information coder 540 when a message indicating non-coincidence of the two pieces of data is input from the prediction section 510. The run counting section 520 in this example counts up a number by which prediction is false consecutively (hereinafter referred to as "the number of literals") when a message indicating non-coincidence of the two pieces of data is input from the prediction section 510. The run counting section 520 outputs the number of literals so far to the common-information coder 540 when a message indicating coincidence of the two pieces of data is input from the prediction section 510.

The color-information separation section 530 separates each pixel data input from the data adjustment section 500 into plural color component values in accordance with the comparison result made by the prediction section 510, and outputs the separated color component values to the unique-information coder (i.e. the R color information coder 552, the G color information coder 554 and the B color information coder 556).

When notices of coincidence of the prediction data and pixel data are given from the run counting section 520 consecutively, the color-information separation section 530 in this example separates only one piece of pixel data into an R component, a G component and a B component, and outputs the separated R, G and B components to the R color information coder 552, the G color information coder 554 and the B color information coder 556 respectively. When a notice of non-coincidence of the prediction data and the pixel data is given from the run counting section 520, the color-information separation section 530 in this example separates each piece of the pixel data into an R component, a G component and a B component, and outputs the separated R, G and B components to the R color information coder 552, the G color information coder 554 and the B color information coder 556 respectively.

That is, the coding program 5 in this example codes only one pixel value (formed from plural color components) included in a run while the run is consecutive. The coding program 5 codes pixel values of pixels individually for the pixels located out of the run.

The common-information coder 540 performs entropy coding on each common intermediate code input from the run counting section 520. The common intermediate code is an intermediate code common to the plural color components, among intermediate codes generated by the source coder.

The common-information coder 540 in this example performs entropy coding on each run length input from the run counting section 520 or to each identifier (literal) and the number of literals input from the run counting section 520, and outputs the generated code data as common code data to the outside. The identifier expresses a pixel out of the run.

The unique-information coder (i.e. the R color information coder 552, the G color information coder 554 and the B color information coder 556) performs entropy coding on unique intermediate codes input from the color-information separation section 530. Each unique intermediate code is an intermediate code unique to each color component, among the intermediate codes generated by the source coder.

The unique-information coder (i.e. the R color information coder 552, the G color information coder 554 and the B color information coder 556) in this example performs entropy coding on color component values input from the color-information separation section 530, and outputs the coded color component values as unique code data to the outside. That is, the R color information coder 552 codes each R component value. The G color information coder 554 codes each G component value. The B color information coder 556 codes each B component value.

Figure 3:
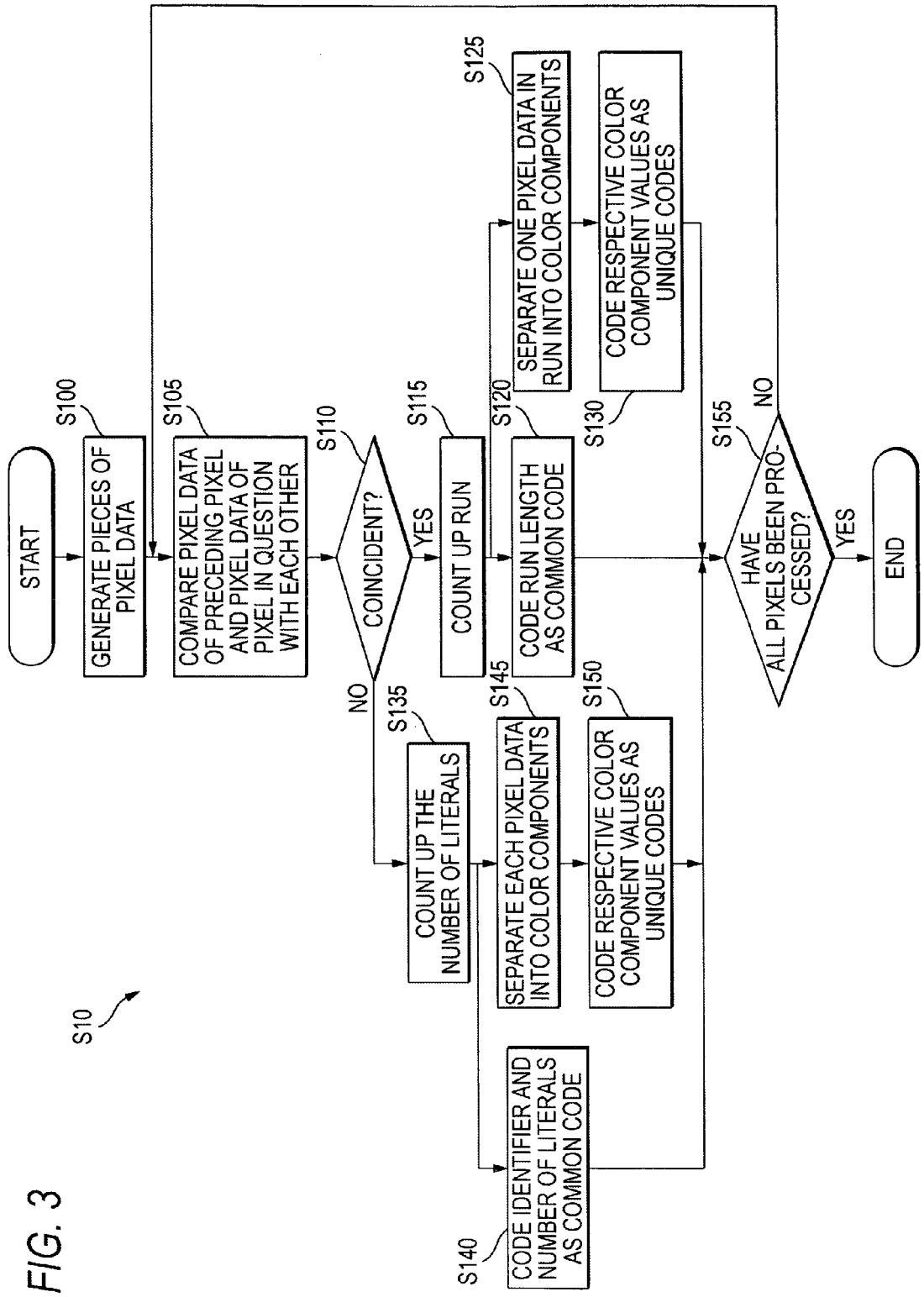
FIG. 3 is a flow chart of a coding process (S10) to be performed by a coding program 5 (FIG. 2)

FIG. 3 is a flow chart of a coding process (S10) to be performed by the coding program 5 (FIG. 2).

Figure 4A:
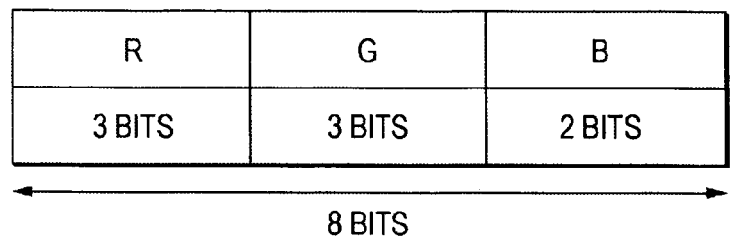
FIGS. 4A to 4C are views showing data generated in the coding process (S10)
Figure 4B:
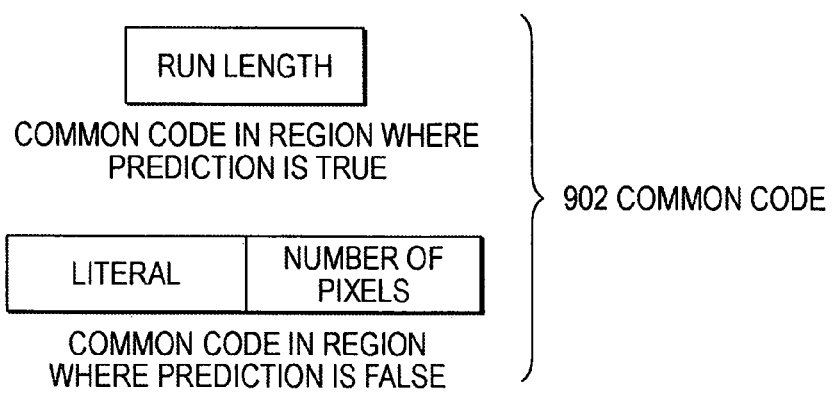
Figure 4C:
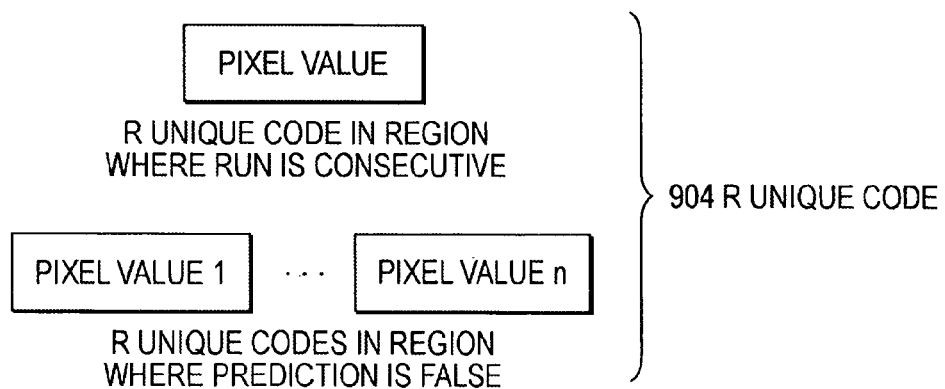

FIGS. 4A to 4C are views showing data generated in the coding process (S10).

As shown in FIG. 3, in Step 100 (S100), the data adjustment section 500 (FIG. 2) performs a color limiting process on input image data (RGB), so that plural color components limited thus are arranged to thereby generate pixel data.

As shown in FIG. 4A, each generated pixel data includes an R value, a G value and a B value with a reduced number of gradations.

In Step 105 (S105), the data adjustment section 500 sets a pixel in question X in a sequence of scanning from the generated pieces of pixel data, and outputs pixel data of the pixel in question X to the prediction section 510 and the color-information separation section 530.

The prediction section 510 (FIG. 2) holds pixel data of a pixel preceding to the pixel in question X as prediction data, compares the prediction data and the pixel data of the pixel in question X with each other, and outputs a result of the comparison to the run counting section 520.

When the pixel data of the pixel in question X is coincident with the prediction data (when prediction proves to be true) in Step 110 (S110), the coding program 5 proceeds to a process of S115. When the pixel data of the pixel in question X is not coincident with the prediction data (when prediction proves to be false) in Step 110 (S110), the coding program 5 proceeds to a process of S135.

When a message indicating coincidence of the pixel data and the prediction data is input from the prediction section 510, the run counting section 520 starts to count up a run in Step 115 (S115).

The data adjustment section 500 sets a pixel in question X in the sequence of scanning until pixel data and prediction data are not coincident with each other. The prediction section 510 compares pixel data set in the sequence with pixel data (i.e. prediction data) preceding to the set pixel data, and outputs a massage indicating coincidence of the pixel data and the prediction data to the run counting section 520.

The run counting section 520 counts up the run until pixel data and prediction data are not coincident with each other. The run counting section 520 outputs the count value as a run length to the common-information coder 540.

The run counting section 520 gives the color-information separation section 530 a notice of the counting of the run.

In Step 120 (S120), the common-information coder 540 performs entropy coding on the run length (common intermediate code) input from the run counting section 520, and outputs a code of the run length as a common code to the outside.

When a notice of the counting of the run is given from the run counting section 520, the color-information separation section 530 separates one piece of pixel data input from the data adjustment section 500 into color component values, and outputs these separated R, G and B values to the R color information coder 552, the G color information coder 554 and the B color information coder 556, respectively, in Step 125 (S125).

In Step 130 (S130), the R color information coder 552, the G color information coder 554 and the B color information coder 556 perform entropy coding on the respective R, G, and B values input from the color-information separation section 530, and outputs codes of the R, G and B values as respective color unique codes to the outside.

When a message indicating non-coincidence of the pixel data and the prediction data is input from the prediction section 510, the run counting section 520 starts to count up the number of literals in Step 135 (S135).

The data adjustment section 500 sets a pixel in question X in the sequence of scanning until pixel data and prediction data are coincident with each other. The prediction section 510 compares pixel data set in the sequence with pixel data (i.e. prediction data) preceding to the set pixel data, and outputs a message indicating non-coincidence of the set pixel data and the prediction data to the run counting section 520.

The run counting section 520 counts up the number of literals until pixel data and prediction data are coincident with each other. The run counting section 520 outputs the literal (identifier) and the number of literals to the common-information coder 540.

The run counting section 520 gives the color-information separation section 530 a notice of the counting of the number of literals.

In Step 140 (S140), the common-information coder 540 performs entropy coding on the literal (identifier indicating non-coincidence of pixel data and prediction data) and the number of literals input from the run counting section 520, and outputs a code of the literal and the number of literals as a common code to the outside.

When a notice of the counting of the number of literals is given from the run counting section 520, the color-information separation section 530 separates each piece of the pixel data input from the data adjustment section 500 into color component values, and outputs these separated R, G and B values to the R color information coder 552, the G color information coder 554 and the B color information coder 556, respectively, in Step 145 (S145).

In Step 150 (S150), the R color information coder 552, the G color information coder 554 and the B color information coder 556 perform entropy coding on the R, G and B values input from the color-information separation section 530, and output codes of the R, G and B values as respective color unique codes to the outside.

In Step 155 (S155), the coding program 5 judges whether processing has been performed on all the pixels in the input image data or not. When there is still any pixel which has not been processed yet, the coding program 5 returns to the process of S105. When all the pixels have been processed, the coding program 5 terminates the coding process (S10).

As described above, when pixel data and prediction data are coincident with each other, the run length is coded as a common code 902 (FIG. 4B) and the pixel value is coded as a unique code (only an R unique code is shown in FIG. 4C). When pixel data and prediction data are not coincident with each other, the literal and the number of literals (the number of pixels) are coded as a common code 902 (FIG. 4B) and the plural pixel values are coded as unique codes (see R unique codes 904 in FIG. 4C).

FIG. 5A is a view for explaining code data 900 generated by the coding process (S10). FIG. 5B is a view for explaining code data obtained by coding respective color components simply by a run-length coding system.

As shown in FIG. 5A, the code data 900 generated in the coding process (S10) in the exemplary embodiment includes a common code 902, and unique codes. The common code 902 is required in common to plural color components. The unique codes (i.e. an R unique code 904, a G unique code 906 and a B unique code 908 in this example) are unique to the respective color components (i.e. an R component, a G component and a B component in this example).

In this example, the common code 902 includes a run length, a literal, and the number of literals. The run length expresses a number of times pixel data and prediction data were coincident with each other consecutively. The literal expresses the fact that pixel data and prediction data were not coincident with each other. The number of literals expresses a number of times pixel data and prediction data were not coincident with each other consecutively.

In this example, the R unique code 904 includes an R component value (an R pixel value in the run) as information unique to the R component when pixel data and prediction data are coincident with each other, and R component values (R pixel values predicted falsely) as information unique to the R component when pixel data and prediction data are not coincident with each other. Similarly, the G unique code 906 includes a G pixel value in the run, and G pixel values predicted falsely. The B unique code 908 includes a B pixel value in the run, and B pixel values predicted falsely.

On the other hand, when the color image (RGB) is split into an R image, a G image and a B image and these split images are coded by a run-length coding system respectively, plane-interleave code data shown in FIG. 5B are generated.

As apparent from comparison of the code data 900 shown in FIG. 5A and the plane-interleave code data shown in FIG. 5B with each other, the run lengths, the literals, and the numbers of pixels (the numbers of literals) are redundant in the plane-interleave code data simply coded in the plane-interleave manner.

Since there is a difference between execution of the prediction process on each pixel data and execution of the prediction process on each color component value, the run length and the number of pixels (the number of literals) contained in the code data 900 are not perfectly coincident with the run lengths (i.e. the R run length, the G run length and the B run length) and the numbers of literals (i.e. the number of R pixels, the number of G pixels and the number of B pixels) but it is conceived that the both are mostly coincident with each other.

Decoding Program

Next, a decoding process will be described.

Figure 6:
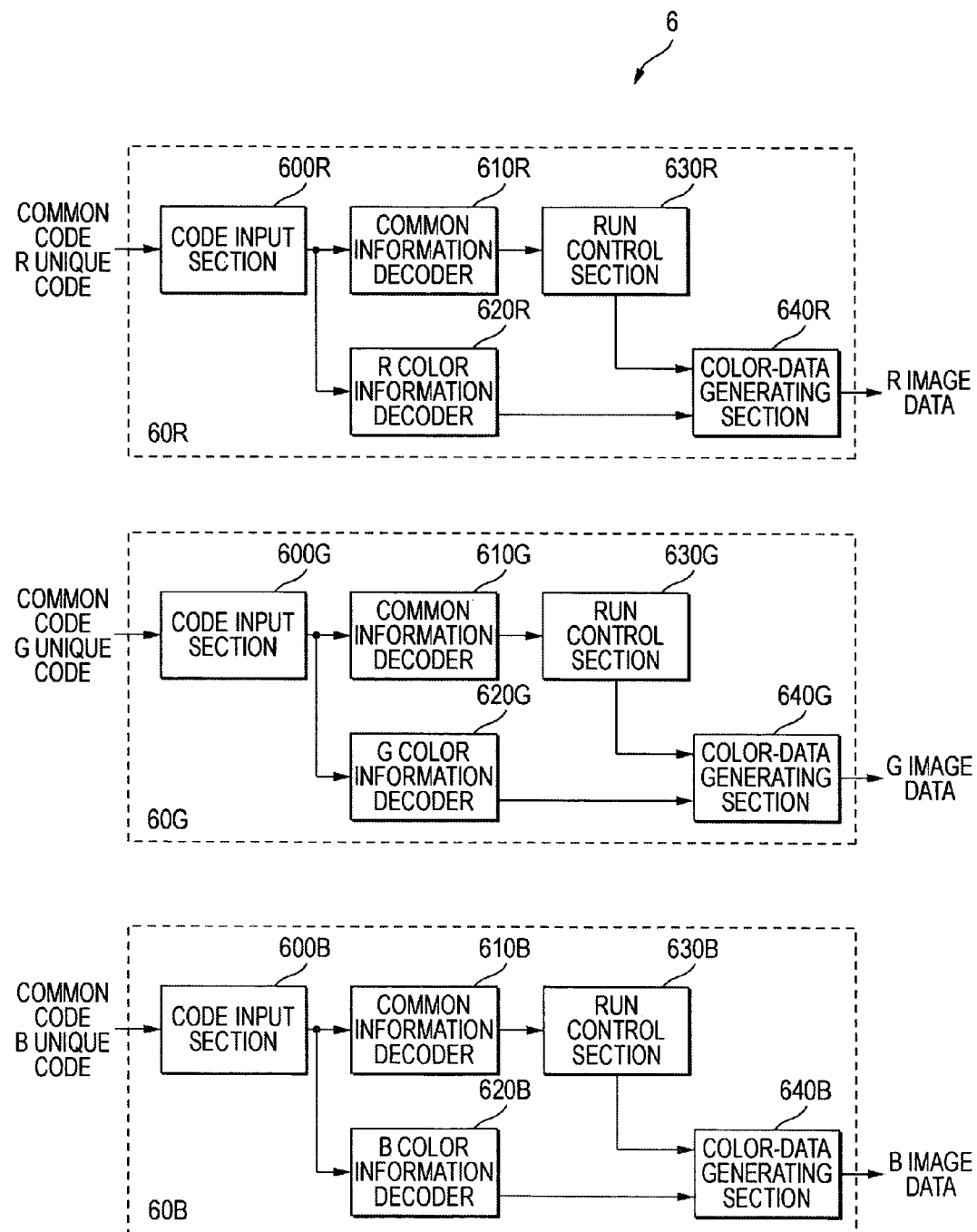
FIG. 6 is a block diagram showing the functional configuration of a first decoding program 6 executed by the control device 21 (FIG. 1) to achieve of the decoding method according to the exemplary embodiment of the invention.

FIG. 6 is a block diagram showing the functional configuration of a first decoding program 6 executed by the control device 21 (FIG. 1) to achieve the decoding method according to the exemplary embodiment of the invention.

As shown in FIG. 6, the first decoding program 6 has plural decoding units 60. In this example, the first decoding program 6 has an R color decoding unit 60R for performing a decoding process on an R component, a G color decoding unit 60G for performing a decoding process on a G component, and a B color decoding unit 60B for performing a decoding process on a B component so that the plural color components can be decoded in parallel. These decoding units 60 have substantially one and the same function but colors to be processed in the decoding units 60 are different. Therefore, only the R color decoding unit 60R will be described below.

The R color decoding unit 60R has a code input section 600R, a common information decoder 610R, an R color information decoder 620R, a run control section 630R, and a color-data generating section 640R.

In the decoding program 6, the code input section 600R selects a common code 902 (FIG. 5A) and an R unique code 904 (FIG. 5A) from input code data, outputs the selected common code 902 to the common information decoder 610R, and outputs the selected R unique code 904 to the R color information decoder 620R.

The common information decoder 610R performs entropy decoding on the common code 902 input from the code input section 600R, and outputs the decoded run length or the decoded literal and number of literals to the run control section 630R.

The R color information coder 620R performs entropy decoding on the R unique code 904 input from the code input section 600R, and outputs the decoded number of pixels in the run or the decoded pixel values predicted falsely to the color-data generating section 640R.

When the run length is input from the common information decoder 610R, the run control section 630R instructs the color-data generating section 640R to copy one and the same pixel value by a number of times corresponding to the input run length.

When the literal and the number of literals are input from the common information decoder 610R, the run control section 630R instructs the color-data generating section 640R to take out pixel values of a number corresponding to the input number of literals.

The color-data generating section 640R arranges the pixel values input from the R color information decoder 620R to thereby generate image data for the R component, and outputs the generated image data for the R component to the outside in accordance with the instruction given from the run control section 630R.

Specifically, as soon as the color-data generating section 640R receives the instruction from the run control section 630R to copy one and the same pixel value by a number of times corresponding to the run length, the color-data generating section 640R reproduces the run consisting of one and the same pixel value, by copying the pixel value input from the R color information decoder 620R by the designated number of times. As soon as the color-data generating section 640R receives the instruction from the run control section 630R to take out pixel values of a number corresponding to the number of literals, the color-data generating section 640R reproduces a falsely predicted pixel group by taking out the designated number of pixel values from the data row (pixel value group) input from the R color information decoder 620R.

FIG. 7 is a flow chart of a decoding process (S20) to be performed by the decoding program 6 (FIG. 6). Decoding processes on plural color components are performed in parallel by substantially one and the same operation. Therefore, only the decoding process concerned with the R component will be described below.

As shown in FIG. 7, in Step 200 (S200), the code input section 600R (FIG. 6) selects common codes 902 (FIG. 5A) and R unique codes 904 (FIG. 5A) from input code data, outputs the selected common codes 902 to the common information decoder 610R, and outputs the selected R unique codes 904 to the R color information decoder 620R.

The common information decoder 610R performs entropy decoding on one of the common codes 902 input from the code input section 600R as a code in question, and outputs the decoded run length or the decoded literal and number of literals to the run control section 630R.

The R color information decoder 620R performs entropy decoding on each of the R unique codes 904 input from the code input section 600R independently of the common information decoder 610R, outputs the decoded pixel value (the pixel value in the run or the pixel value predicted falsely) to the color-data generating section 640R. Although the example has been described as a specific example in which the R color information decoder 620R decodes the R unique codes in accordance with the residual capacity of a buffer holding the entropy-decoded pixel values, the R color information decoder 620R may decode the R unique codes in accordance with the run length or the number of literals decoded by the common information decoder 610R.

In Step 205 (S205), the run control section 630R judges whether the decoded information is a run length or a number of literals, based on whether the literal is input from the common information decoder 610R or not.

When the decoded code in question is a run length, the decoding program 6 proceeds to a process of S210. When the decoded code in question includes a number of literals, the decoding program 6 proceeds to a process of S220.

When the run length is input from the common information decoder 610R, the run control section 630R instructs the color-data generating section 640R to copy one and the same pixel value by a number of times corresponding to the input run length in Step 210 (S210).

In Step 215 (S215), the color-data generating section 640R copies the pixel value (leftmost 3 bits in this example) input from the color information decoder 620R the designated number of times in accordance with the instruction from the run control section 630R, reproduces a run consisting of the copied one and the same pixel value, and outputs the reproduced run (run pixel group) to the outside.

When the literal and the number of literals are input from the common information decoder 610R, the run control section 630R instructs the color-data generating section 640R to take out the pixel values of a number corresponding to the input number of literals in Step 220 (S220).

In Step 225 (S225), the color-data generating section 640R takes out the designated number of pixel values (each pixel value has 3 bits in this example) from the data row (pixel value group) input from the R color information decoder 620R in accordance with the instruction from the run control section 630R, reproduces a falsely predicted pixel group, and outputs the reproduced pixel group to the outside.

In Step 230 (S230), the decoding program 6 judges whether all the input common codes 902 have been processed or not. When there is still any common code 902 which has been not processed yet, the decoding program 6 returns to S200 to perform the processes of S200 to S225 on a next common code 902 as a code in question. When all the common codes 902 have been processed, the decoding program 6 terminates the decoding process (S20).

In this manner, the decoding program 6 in this exemplary embodiment can decode code data of each color component individually and independently. That is, because the decoding program 6 can perform the decoding process in the plane-interleave manner, the coding process according to the exemplary embodiment of the invention is suitable for a device such as a printer which performs processing on each color component independently.

Second Exemplary Embodiment

Next, a second exemplary embodiment will be described.

Although the previous embodiment has been described in the form in which the invention is applied to a run-length coding system, the invention may be applied to another coding system.

To this end, the second exemplary embodiment will be described in a form in which the invention is applied to a predictive coding system provided with plural predictors.

Figures 8A, 8B, 8C:
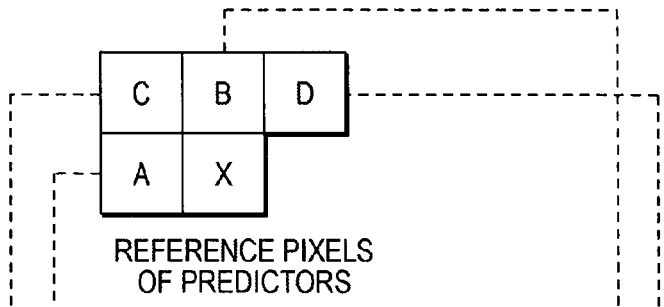
FIGS. 8A to 8C are views for explaining a predictive coding system used in a second exemplary embodiment.

FIGS. 8A to 8C are views for explaining the predictive coding system used in the second exemplary embodiment. FIG. 8A shows positions of pixels to be referred to by plural predictors respectively. FIG. 8B shows codes associated with the predictors (i.e. reference pixels) respectively. FIG. 8C shows code data generated by the predictive coding system.

As shown in FIG. 8A, the plural predictors refer to plural reference pixels A to D (each reference pixel means a pixel to be referred to) in given relative positions with respect to a pixel in question X, and read pixel values of the reference pixels A to D as prediction values for the pixel in question X. Specifically, the reference pixel A is set in an upstream side of the pixel in question X in a main scanning direction, while the reference pixels B to D are set on a main scanning line above the pixel in question X (in an upstream side in a sub scanning direction).

A prediction error calculation portion calculates a difference between a pixel value of the pixel in question X and a pixel value of the reference pixel A (pixel preceding to the pixel in question) as a prediction error value.

As shown in FIG. 8B, codes are associated with the predictors A to D (i.e. reference pixels A to D) respectively. That is, in this example, reference positions (the reference pixels A to D) correspond to prediction methods and codes are assigned to the reference positions respectively.

When any one of the prediction values (i.e. pixel values of the reference pixels A to D) is coincident with the pixel value of the pixel in question X (i.e. prediction is true), the number of times of consecutive coincidence of a predictor ID corresponding to the reference position where prediction is true is counted, and the predictor ID and the number of times of consecutive coincidence are coded. When there is no prediction value coincident with the pixel value of the pixel in question X (i.e. prediction is false), a prediction error value is coded.

As shown in FIG. 8C, generated code data include a code (code A, code B, etc.) indicating a corresponding predictor ID, the number of times of consecutive coincidence (number in the run) prediction of the predictor is true consecutively, and a code of a prediction error value.

Figure 9A:
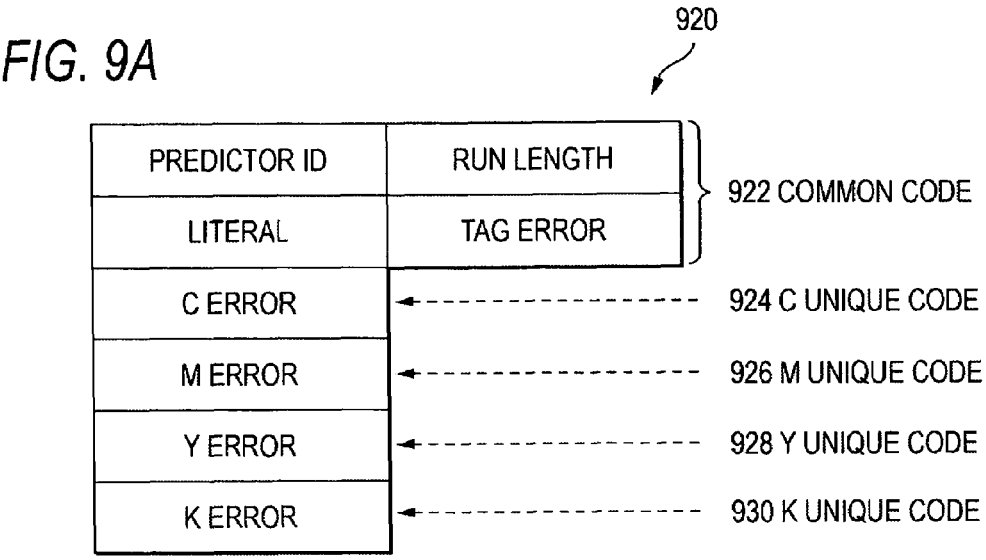
FIGS. 9A to 9C are views for explaining code data generated by the predictive coding system described in FIGS. 8A to 8C.
Figure 9B:
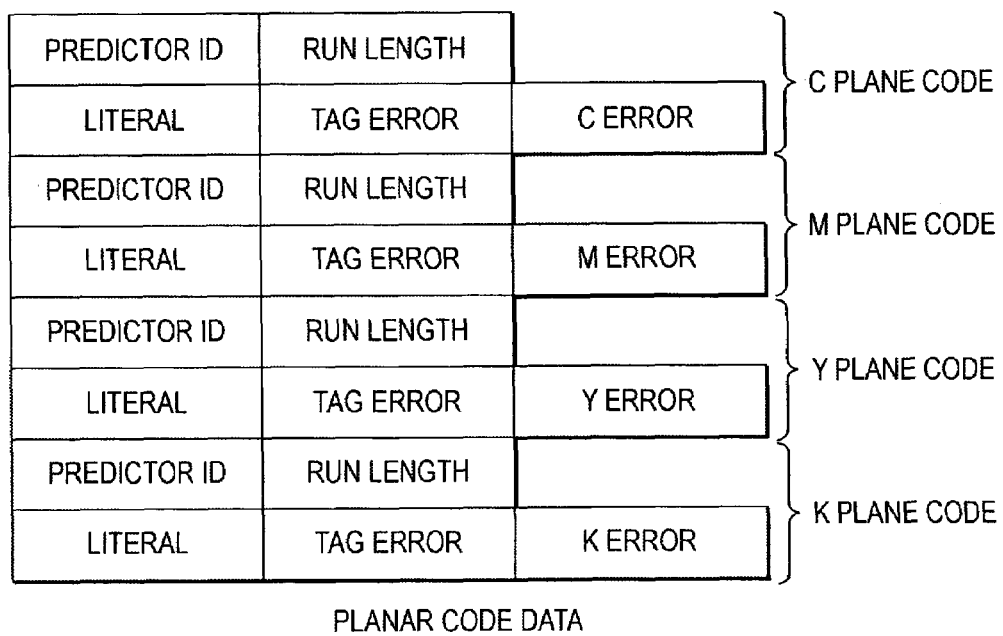
Figure 9C:
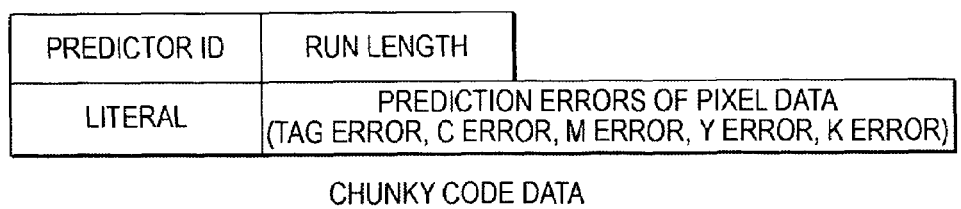

FIGS. 9A to 9C are views for explaining code data generated by the predictive coding system described in FIGS. 8A to 8C. FIG. 9A shows code data 920 generated in this exemplary embodiment. FIG. 9B shows plane-interleave code data in the case where each color component is coded simply by the predictive coding system. FIG. 9C shows dot-sequential code data when each pixel is coded by the predictive coding system.

In this exemplary embodiment, a prediction process is performed on each pixel (i.e. on each pixel data). In this example, the pixel data includes pixel values of plural color components, and additional information (tag information) added to each pixel, so that a predictor ID, a run length (number of times of consecutive coincidence) of the predictor, a literal indicating that prediction is false, and additional information to a pixel (tag error in this example) are coded as a common code 922 common to the respective color components, and prediction pixel values of the respective color components (a C error, an M error, a Y error and a K error) are coded as unique codes (a C unique code 924, an M unique code 926, a Y unique code 928 and a K unique code 930) unique to the respective color components, as shown in FIG. 9A.

On the other hand, when plane-interleave coding is performed simply, plane-interleave code data shown in FIG. 9B are generated. In the plane-interleave code data, predictor IDs, run lengths, literals, and tag errors are duplicate and redundant among plural color components.

When dot-sequential coding is performed simply, dot-sequential code data shown in FIG. 9C are generated. Since pixel data calculated in accordance with each pixel data are included in the dot-sequential code data, pixel values of respective color components cannot be calculated unless the whole of the pixel data have been decoded. That is, when dot-sequential coding is performed simply, the coded data cannot be decoded in the plane interleave manner.

Coding Program

Figure 10:
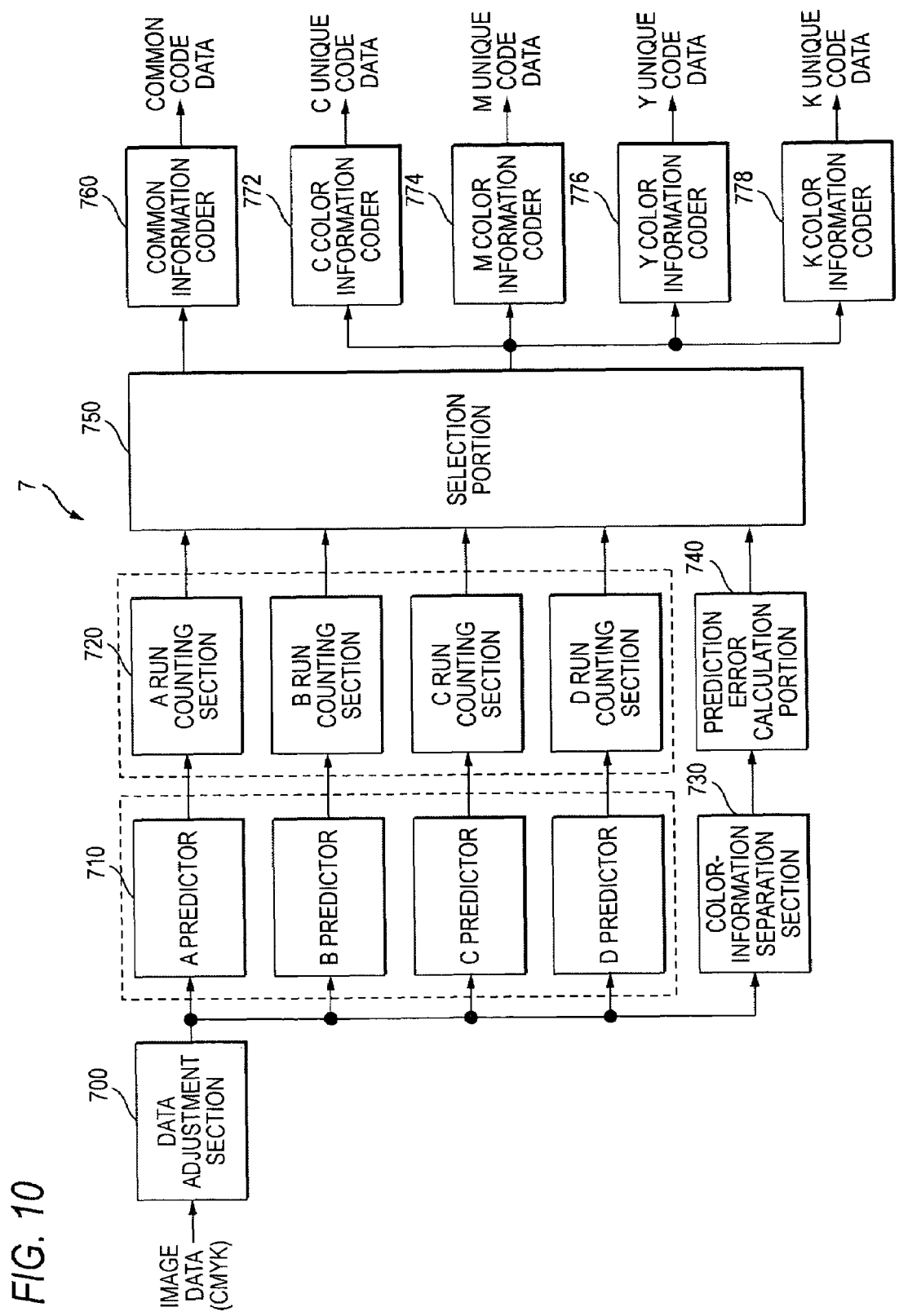
FIG. 10 is a block diagram showing the functional configuration of a second coding program 7 executed by the control device 21 (FIG. 1) to achieve a coding method according to the exemplary embodiment of the invention.

FIG. 10 is a block diagram showing the functional configuration of a second coding program 7 executed by the control device 21 (FIG. 1) to achieve a coding method according to the exemplary embodiment of the invention.

As shown in FIG. 10, the second coding program 7 includes a data adjustment section 700, plural predictors 710, plural run counting sections 720, a color-information separation section 730, a prediction error calculation portion 740, a selection portion 750, a common information coder 760, and a unique-information coder. The unique-information coder includes a C color information coder 772, an M color information coder 774, a Y color information coder 776 and a K color information coder 778. The plural predictors 710, the plural run counting sections 720, the color-information separation section 730, the prediction error calculation portion 740 and the selection portion 750 are equivalent to a source coder. The common information coder 760 and the unique-information coder are equivalent to an entropy coder.

In the coding program 7, the data adjustment section 700 converts input image data into pieces of pixel data as units to be processed in the predictors 710.

Since this example is described as a specific example in which a CMYK color image is input, the data adjustment section 700 in this example generates pieces of pixel data by arranging C values, M values, Y values and K values of the input CMYK image and tag information designating a control method for the pixels, and outputs the generated pixel data to the predictors 710 and the color-information separation section 730.

Each of the predictors 710 generates prediction data for the input pixel data by a given prediction method, compares the generated prediction data with the pixel data as a processing target, and outputs a result of the comparison to a corresponding run counting section 720. The comparison result is information indicating whether a difference between the pixel data and the prediction data is in a predetermined range (hereinafter referred to as "acceptable range") or not, such as information indicating whether the pixel data and the prediction data are coincident with each other or not. The acceptable range is an irreversibility allowable range. When the difference between the pixel data and the prediction data is in the acceptable range, coding is made in the condition that the pixel data and the prediction data are regarded as coincident with each other.

In this example, an A predictor 700A reads pixel data of a reference pixel A shown in FIG. 8A as prediction data, compares the prediction data and pixel data of a pixel in question X with each other, and outputs a result of the comparison to an A run counting section 720A. Similarly, a B predictor 700B reads pixel data of a reference pixel B shown in FIG. 8A as prediction data, and outputs a comparison result to a B run counting section 720B. A C predictor 700C reads pixel data of a reference pixel C shown in FIG. 8A as prediction data, and outputs a comparison result to a C run counting section 720C. A D predictor 700D reads pixel data of a reference pixel D shown in FIG. 8A as prediction data, and outputs a comparison result to a D run counting section 720D.

Each run counting section 720 counts the number of times of consecutive coincidence (run length) prediction proves to be true consecutively in one and the same reference position, based on a comparison result input from each predictor 710. The run counting section 720 gives the selection portion 750 a notice of the comparison result input from the predictor 710.

In this example, the A run counting section 720A counts the run length of the reference position A based on the comparison result input from the A predictor 710A, and outputs the predictor ID and the run length of the reference position A to the selection portion 750. Similarly, the other run counting sections 720 count the run lengths of the other reference positions based on the comparison results input from the other predictors 710 correspondingly, and output the predictor IDs and the run lengths of the other reference positions to the selection portion 750.

The color-information separation section 730 separates the pixel data input from the data adjustment section 700 into plural color component values and tag information, and outputs these separated color component values and tag information to the prediction error calculation portion 740.

The prediction error calculation portion 740 calculates prediction error values of the respective color component values and tag information based on the plural color component values and tag information input from the color-information separation section 730, and outputs the calculated prediction error values of the respective color components (a C error, an M error, a Y error, and a K error) and the calculated tag error value for the respective color components to the selection portion 750.

The selection portion 750 holds the predictor IDs and the run lengths input from the respective run counting sections 720 while a message that prediction is true is input from any run counting section 720. When a message that prediction is false is input from each of the run counting sections 720, the selection portion 750 determines a combination of a predictor ID and a run length as the longest run on the basis of the held predictor IDs and run lengths, and outputs the determined predictor ID and run length to the common information coder 760.

Then, the selection portion 750 outputs the prediction error values (the C error, the M error, the Y error and the K error) of the respective color components input from the prediction error calculation portion 740 to the C color information coder 772, the M color information coder 774, the Y color information coder 776 and the K color information coder 778, respectively, and outputs the prediction error (tag error) of the tag information input from the prediction error calculation portion 740 to the common information coder 760.

The common information coder 760 performs entropy coding on a common intermediate code (the predictor ID, the run length, the literal and the tag error) input from the selection portion 750.

The unique-information coder (the C color information coder 772, the M color information coder 774, the Y color information coder 776 and the K color information coder 778) performs entropy coding on unique intermediate codes (the C error, the M error, the Y error and the K error) input from the selection portion 750.

Figure 11:
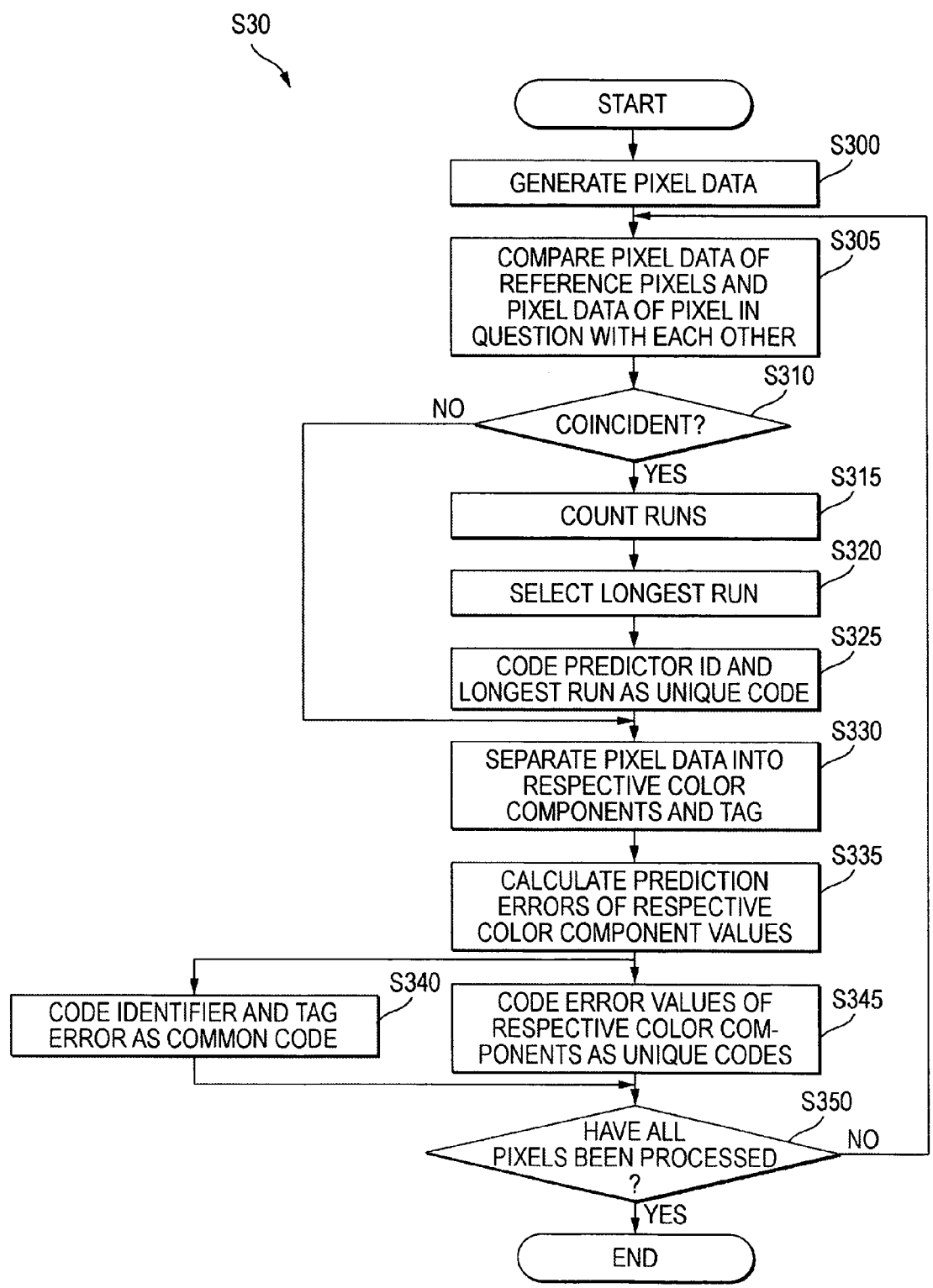
FIG. 11 is a flow chart of a coding process (S30) to be performed by the coding program 7 (FIG. 10)

FIG. 11 is a flow chart of a coding process (S30) to be performed by the coding program 7 (FIG. 10).

As shown in FIG. 11, in Step 300 (S300), the data adjustment section 700 (FIG. 10) generates pixel data by arranging input image data (CMYK, tag).

In Step 305 (S305), the data adjustment section 700 sets a pixel in question X in a sequence of scanning from the generated pixel data, and outputs pixel data of the pixel in question X to the plural predictors 710 and the color-information separation section 730.

The plural predictors 710 (FIG. 10) hold pixel data of reference pixels corresponding to the pixel in question X as prediction data, compares the prediction data and the pixel data of the pixel in question X with each other, and outputs results of the comparison to corresponding run counting sections 720.

When the pixel data of the pixel in question X was coincident with any one of the prediction data (prediction is true) in Step 310 (S310), the coding program 7 proceeds to a process of S315. When the pixel data of the pixel in question X was not coincident with any one of the prediction data in Step 310 (S310), the coding program 7 proceeds to a process of S330.

When messages that the pixel data and the prediction data were coincident with each other are input from the corresponding predictors 710, the plural run counting sections 720 start to count up runs in Step 315 (S315).

The data adjustment section 700 sets a pixel in question in the sequence of scanning until pixel data and prediction data are not coincident with each other. The plural predictors 710 compare pixel data set in the sequence and prediction data with each other, and output messages that the pixel data and the prediction data are coincident with each other, to the run counting sections 720 respectively.

The run counting sections 720 count runs until pixel data and prediction data are not coincident with each other. The run counting sections 720 output count values as run lengths to the selection portion 750.

Each of the plural run counting sections 720 gives the selection portion 750 a notice of the comparison result (as to whether the pixel data and the prediction data are coincident with each other or not).

When a message that prediction is false (a message that the pixel data and the prediction data were not coincident with each other) is input from each of the run counting sections 720, the selection portion 750 determines an optimal combination of a predictor ID and a run length on the basis of the predictor IDs and the run lengths input from the plural run counting sections 720, and outputs the determined predictor ID and run length to the common information coder 760 in Step 320 (S320).

In Step 325 (S325), the common information coder 760 performs entropy coding on the predictor ID and run length input from the selection portion 750, and outputs a code of the predictor ID and run length as a common code 922 (FIG. 9A) to the outside.

In Step 330 (S330), the color-information separation section 730 separates each piece of the pixel data input from the data adjustment section 700 into color component values (a C value, an M value, a Y value and a K value) and tag information, and outputs the separated color component values and tag information to the prediction error calculation portion 740.

In Step 335 (S335), the prediction error calculation portion 740 calculates prediction errors for the respective color component values and tag information of the pixel in question X input from the color-information separation section 730, and outputs the prediction error values (the C error, the M error, the Y error and the K error) of the respective color components and an error of the tag information (tag error) to the selection portion 750.

In this flow chart, for the sake of convenience, the pixel data separation process by the color-information separation section 730 and the prediction error calculation process by the prediction error calculation portion 740 are described as processes subsequent to the prediction process by the prediction sections 710. Practically, the pixel data separation process and the prediction error calculation process are performed on all the pixel in questions X independently of the operations by the predictors 710 etc.

When prediction of each of the predictors 710 is false (i.e. the run is interrupted) (via S325 from S315) or when prediction is false consecutively (S310: No), the selection portion 750 outputs the tag error and literal of the pixel in question X at that time, out of the prediction errors (the prediction error values of the respective color components and the tag error) input from the prediction error calculation portion 740, to the common information coder 760, and outputs the C error, M error, Y error and K error of the pixel in question X at that time to the C color information coder 772, the M color information coder 774, the Y color information coder 776 and the K color information coder 778, respectively.

In Step 340 (S340), the common information coder 760 performs entropy coding on the literal and tag error input from the selection portion 750, and outputs the coded literal and tag error as a common code 922 to the outside.

In Step 345 (S345), the C color information coder 772, the M color information coder 774, the Y color information coder 776 and the K color information coder 778 perform entropy coding on the C error, M error, Y error and K error input from the selection portion 750, and output the coded C error, M error, Y error and K error as a C unique code 924, an M unique code 926, a Y unique code 928 and a K unique code 930, respectively, to the outside.

In Step S350 (S350), the coding program 7 judges whether processing has been performed on all the pixels of the input image data or not. When there is still any pixel which has been not processed yet, the coding program 7 returns to the process of S305. When all the pixels have been processed, the coding program 7 terminates the coding process (S30).

Decoding Program

Next, a decoding process in the second exemplary embodiment will be described.

Figure 12:
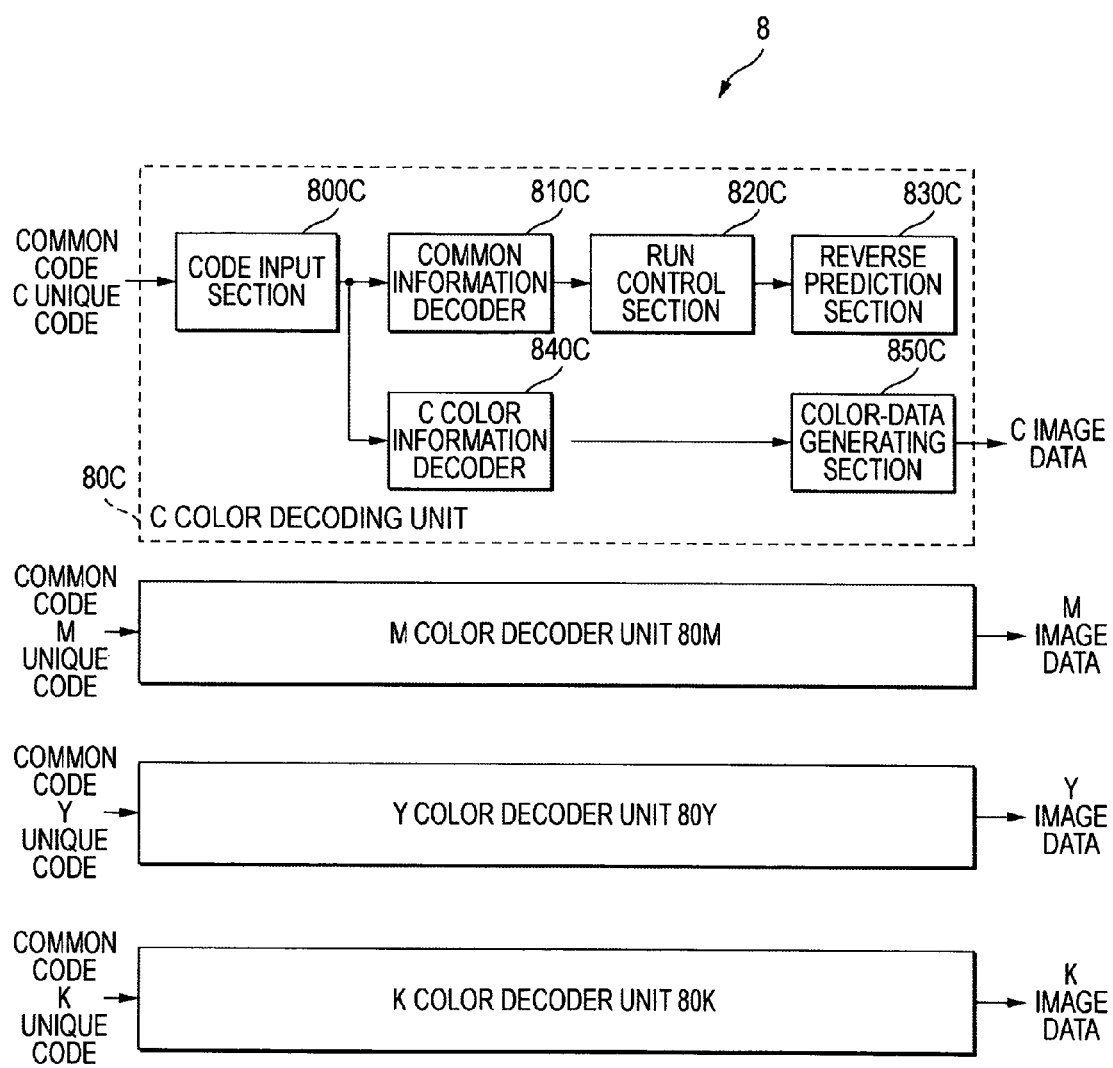
FIG. 12 is a block diagram showing the functional configuration of a second decoding program 8 executed by the control device 21 (FIG. 1) to achieve a decoding method according to the exemplary embodiment of the invention.

FIG. 12 is a block diagram showing the functional configuration of a second decoding program 8 executed by the control device 21 (FIG. 1) to achieve a decoding method according to the exemplary embodiment of the invention.

As shown in FIG. 12, the second decoding program 8 has four decoding units 80. These decoding units 80 have substantially one and the same function but colors to be processed in the decoding units 80 are different. Therefore, only a C color decoding unit 80C for performing a decoding process on a C component will be described below.

The C color information unit 80C has a code input potion 800C, a common information decoder 810C, a run control section 820C, a reverse prediction section 830C, a C color information decoder 840C, and a color-data generating section 850C.

In this decoding program 8, the code input section 800C selects each common code 922 (FIG. 9A) and each C unique code 924 (FIG. 9A) from input code data, outputs the selected common code 922 to the common information decoder 810C, and outputs the selected C unique code 924 to the C color information decoder 840C.

The common information decoder 810C performs entropy decoding on the common code 922 input from the code input section 800C, and outputs the decoded predictor ID and run length or the decoded literal and tag error to the run control poor 820C.

When the predictor ID and the run length are input from the common information decoder 810C, the run control section 820C instructs the reverse prediction section 830C to generate prediction data (C value and tag information) in accordance with the input predictor ID and run length.

When the literal and the tag error are input from the common information decoder 810C, the run control section 820C instructs the reverse prediction section 830C to read prediction data (C value and tag information) of a reference pixel A. The literal and the tag error are output to the color-data generating section 850C through the reverse prediction section 830C.

The reverse prediction section 830C generates prediction data in accordance with the instruction of the run control section 820C and outputs the generated prediction data to the color-data generating section 850C.

Specifically, when the prediction ID and the run length are designated by the run control section 820C, the reverse prediction section 830C reads the C value and tag information (the decoded C value and tag information) of a reference pixel (FIG. 8A) corresponding to the predictor ID by a number of times corresponding to the run length, and outputs the C values and tag information as decoded pixel values to the color-data generating section 850C. When an instruction is issued from the run counting section 820C to read the pixel data of the reference pixel A, the reverse prediction section 830C reads the C value and tag information of the reference pixel A in accordance with the instruction and outputs the read C value and tag information to the color-data generating section 850C.

The C color information decoder 840C performs entropy decoding on the C unique code 924 input from the code input section 800C, and outputs the decoded C error to the color-data generating section 850C.

The color-data generating section 850C generates image data of a C color component based on the prediction data input from the reserve prediction section 830C and each prediction error (C error) input from the C color information decoder 840C, and outputs the generated image data of the C color component to the outside.

Specifically, when each literal is input from the reverse prediction section 830C (i.e. when each pixel regarded as predicted falsely is decoded), the color-data generating section 850C calculates the sum of the C value (prediction data) of the reference pixel A input from the reverse prediction section 830C and the C error input from the C color information decoder 840C to thereby generate a C value of a pixel in question X, and calculates the sum of the tag information (prediction data) of the reference pixel A input from the reverse prediction section 830C and the tag error to thereby generate tag information of the pixel in question X.

When no literal is input from the reverse prediction section 830C (i.e. when each pixel regarded as predicted truly is decoded), the color-data generating section 850C sets the prediction data (the C value and tag information of the reference pixel corresponding to the predictor ID) input from the reverse prediction section 830C as a C value and tag information of a pixel in question X directly.

Figure 13:
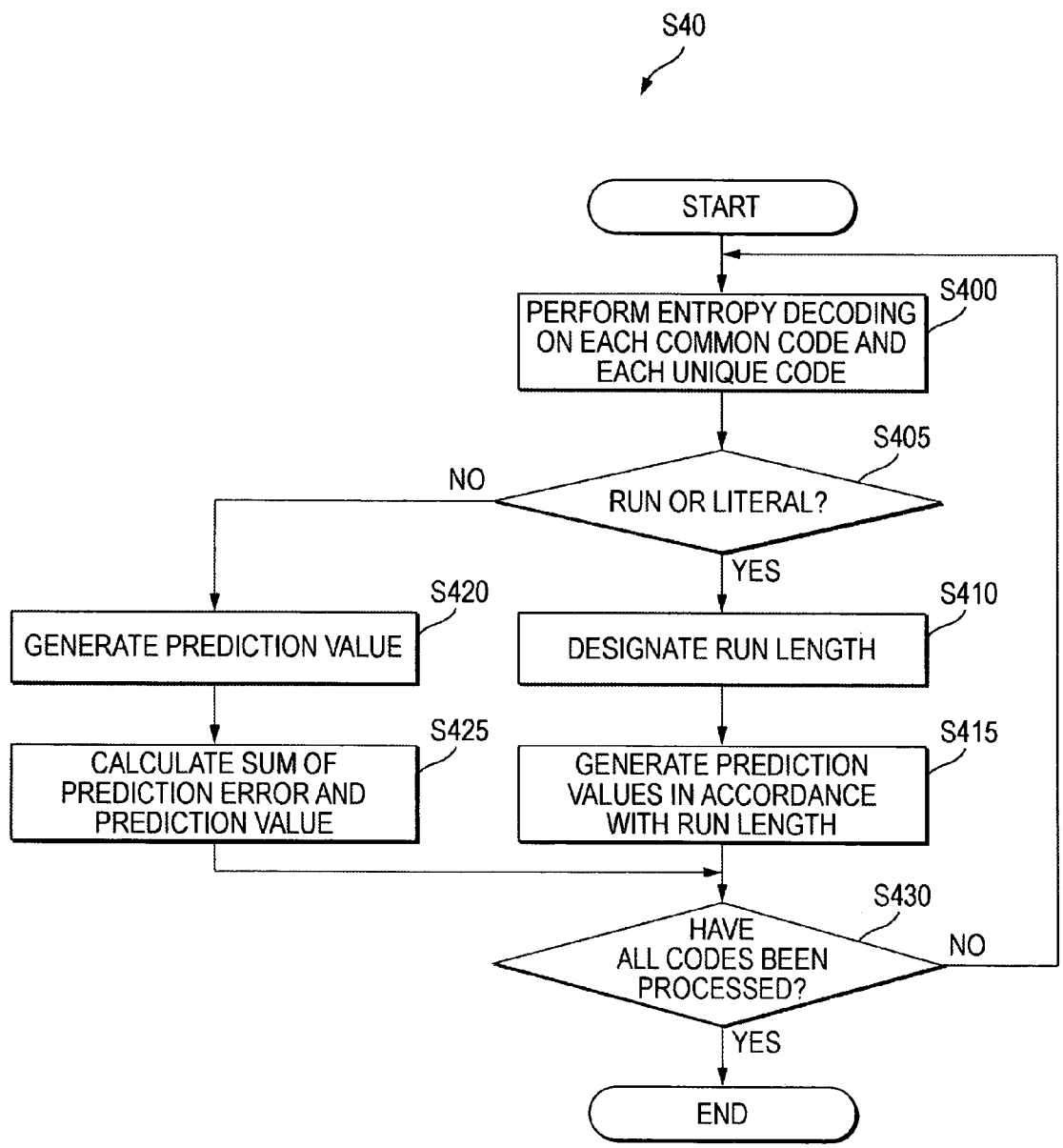
FIG. 13 is a flow chart of a decoding process (S40) to be performed by the decoding program 8 (FIG. 12)

FIG. 13 is a flow chart of a decoding process (S40) to be performed by the decoding program 8 (FIG. 12). Decoding processes on plural color components are performed in parallel by substantially one and the same operation. Therefore, only the decoding process concerned with the C component will be described below.

As shown in FIG. 13, in Step 400 (S400), the code input section 800C (FIG. 12) selects common codes 922 (FIG. 9A) and C unique codes 924 (FIG. 9A) from input code data, outputs the selected common codes 922 to the common information decoder 810C, and outputs the selected C unique codes 924 to the C color information decoder 840C.

The common information decoder 810C performs entropy decoding on one of the common codes 922 input from the code input section 800C as a code in question, and outputs the decoded predictor ID and run length or the decoded literal and tag error to the run control poor 820C.

The C color information decoder 840C performs entropy decoding on the C unique codes 924 input from the code input section 800C independently of the common information decoder 810C, and outputs the decoded prediction error values (C errors) to the color-data generating section 850C. Although this example has been described as a specific example in which the C color information decoder 840C decodes the C unique codes in accordance with the residual capacity of a buffer holding the entropy-decoded prediction error values, the C color information decoder 840C may decode each C unique code in accordance with judgment as to whether a literal has been decoded by the common information decoder 810C or not.

In Step 405 (S405), the run control section 820C judges whether the decoded information is a predictor ID and a run length or a literal and a tag error on the basis of judgment as to whether the literal has been input from the common information decoder 810C or not.

When the decoded code in question includes a predictor ID and a run length, the decoding program 8 proceeds to a process of S410. When the decoded code in question includes a literal and a tag error, the decoding program 8 proceeds to a process of S420.

When the predictor ID and the run length are input from the common information decoder 810C, the run control section 820C instructs the reverse prediction section 830C to perform a prediction process corresponding to the input predictor ID and run length in Step 410 (S410).

In Step 415 (S415), the reverse prediction section 830C performs a prediction process corresponding to the predictor ID a number of times corresponding to the run length while updating the position of a pixel in question X in a scanning direction. By the prediction process, C values and tag information of reference pixels corresponding to the predictor ID are read and output as C values and tag information of pixel in questions X to the color-data generating section 850C.

The color-data generating section 850C outputs the C values and tag information input from the reverse prediction section 830C as values of the respective pixel in questions X to the outside.

When the literal and the tag information are input from the common information decoder 810C, the run control section 820C instructs the reverse prediction section 830C to read a C value and tag information of a reference pixel A in Step 420 (S420).

The reverse prediction section 830C reads the C value and tag information of the reference pixel A as prediction data in accordance with the instruction from the run control section 820C, and outputs the read prediction data to the color-data generating section 850C.

In Step 425 (S425), the color-data generating section 850C calculates a C value and tag information of a pixel in question X on the basis of the prediction data (the C value and tag information of the reference pixel A) input from the reverse prediction section 830C, the tag error decoded by the common information decoder 810C and the prediction error (C error) decoded by the C color information decoder 840C, and outputs the calculated C value and tag information of the pixel in question X to the outside. That is, the sum of the C value of the reference pixel A and the C error becomes the C value of the pixel in question X. The sum of the tag information of the reference pixel A and the tag error becomes the tag information of the pixel in question X.

In Step 430 (S430), the decoding program 8 judges whether all the input common codes 922 have been processed or not. When there is still any common code 922 which has not been processed yet, the decoding program 8 returns to S400 so as to perform the processes of S400 to S425 on a next common code 922 as a code in question. When all the common codes 922 have been processed, the decoding program 8 terminates the decoding program (S40).

Thus, the invention can be also applied to a predictive coding system provided with plural coders 710.

[Modification]

Next, a modification of the aforementioned embodiment will be described.

Figure 14:
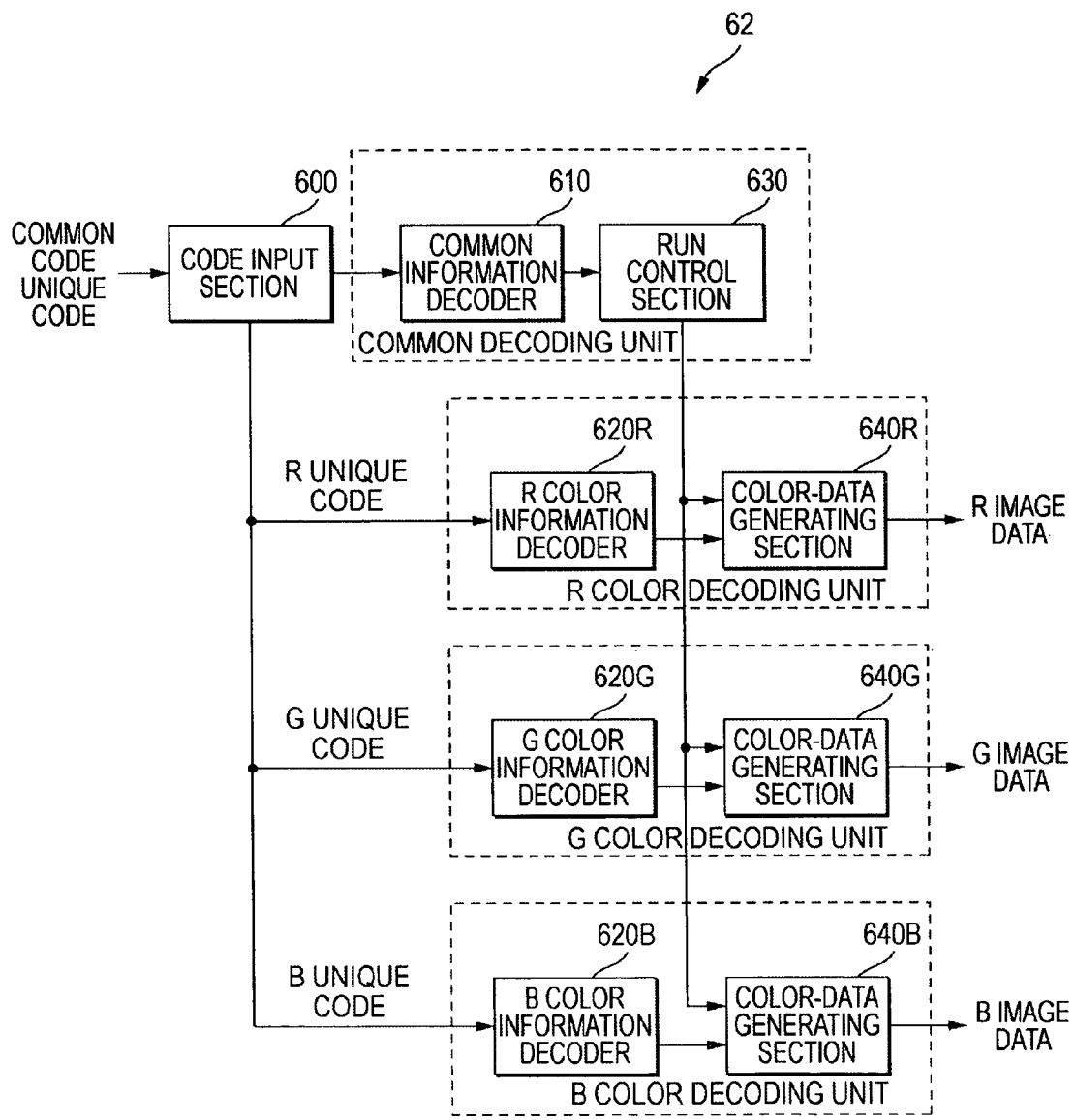
FIG. 14 is a modification of the coding program in the first exemplary embodiment.

FIG. 14 is a modification of the coding program in the first exemplary embodiment. Constituent parts in FIG. 14 substantially the same as those in FIG. 6 are referred to by the same numerals.

As shown in FIG. 14, a third decoding program 62 is configured so that a common portion (a code input section, a common information decoder and a run control section) of the coding program 6 shown in FIG. 6 is used in common among plural color components.

Although FIG. 6 has shown the case where the decoding units are completely separated from one another in order to execute decoding processes on the plural color components asynchronously, the decoding processes on the plural color components may be executed at the same timing. In this case, part of the configuration may be used in common as shown in FIG. 14.

Similarly, also in the decoding program 8 shown in FIG. 12, the common information decoder and the run control section can be used in common.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The invention claimed is:

1. A coding apparatus comprising:
   a predicting unit that generates a piece of prediction data based on each piece of pixel data constituting a color image;
   an intermediate-code generating unit that compares each piece of prediction data with the corresponding piece of pixel data, to generate an intermediate code in accordance with whether or not a difference between each piece of prediction data and the corresponding piece of pixel data is in a range;
   a first coding unit that performs entropy coding on the intermediate code generated by the intermediate-code generating unit; and
   a second coding unit that performs entropy coding on the intermediate code generated by the intermediate-code generating unit, wherein:
   when the difference between each piece of prediction data and the corresponding piece of pixel data is in the range, the intermediate-code generating unit assigns to the first coding unit coincidence information indicating that prediction of the corresponding piece of pixel data is true,
   when the difference between each piece of prediction data and the corresponding piece of pixel data is out of the range, the intermediate-code generating unit assigns to the second coding unit a plurality of color-component values included in the corresponding piece of pixel data,
   the first coding unit performs the entropy coding on a first intermediate code, which relates to a plurality of color components,
   the second coding unit performs the entropy coding on second intermediate codes, which relate to the plurality of color components, respectively,
   the second coding unit comprises a plurality of entropy coders each for performing the entropy coding,
   when the difference between each piece of prediction data and the corresponding piece of pixel data is out of the range, the intermediate-code generating unit assigns to the plurality of entropy coders of the second coding unit the plurality of color-component values included in the corresponding piece of pixel data, respectively, and
   the plurality of entropy coders perform the entropy coding on the assigned color-component values concurrently.

2. A coding apparatus comprising:
a predicting unit that generates a piece of prediction data based on each piece of pixel data constituting a color image;
an intermediate-code generating unit that compares each piece of prediction data with the corresponding piece of pixel data, to generate an intermediate code in accordance with whether or not a difference between each piece of prediction data and the corresponding piece of pixel data is in a range;
a first coding unit that performs entropy coding on the intermediate code generated by the intermediate-code generating unit; and
a second coding unit that performs entropy coding on the intermediate code generated by the intermediate-code generating unit, wherein:
when the difference between each piece of prediction data and the corresponding piece of pixel data is in the range, the intermediate-code generating unit assigns to the first coding unit coincidence information indicating that prediction of the corresponding piece of pixel data is true,
when the difference between each piece of prediction data and the corresponding piece of pixel data is out of the range, the intermediate-code generating unit assigns to the first coding unit literal information indicating that the prediction of the corresponding piece of pixel data is false and assigns to the second coding unit a plurality of color-component values included in the corresponding piece of pixel data,
the first coding unit performs the entropy coding on the coincidence information and the literal information assigned by the intermediate-code generating unit, and
the second coding unit performs the entropy coding on the plurality of color components values assigned by the intermediate-code generating unit.

3. A coding apparatus comprising:
a predicting unit that generates a piece of prediction data based on each piece of pixel data constituting a color image;
an intermediate-code generating unit that compares each piece of prediction data with the corresponding piece of pixel data, to generate an intermediate code in accordance with whether or not a difference between each piece of prediction data and the corresponding piece of pixel data is in a range;
a first coding unit that performs entropy coding on the intermediate code generated by the intermediate-code generating unit; and
a second coding unit that performs entropy coding on the intermediate code generated by the intermediate-code generating unit, wherein:
when the difference between each piece of prediction data and the corresponding piece of pixel data is in the range, the intermediate-code generating unit assigns to the first coding unit coincidence information indicating that prediction of the corresponding piece of pixel data is true,
when the difference between each piece of prediction data and the corresponding piece of pixel data is out of the range, the intermediate-code generating unit assigns to the second coding unit prediction error values for the plurality of color components,
the first coding unit performs the entropy coding on a first intermediate code, which relates to a plurality of color components, and
the second coding unit performs the entropy coding on second intermediate codes, which relate to the plurality of color components, respectively.

4. The apparatus according to claim 3, wherein:
the second coding unit comprises a plurality of entropy coders each for performing the entropy coding,
when the difference between each piece of prediction data and the corresponding piece of pixel data is out of the range, the intermediate-code generating unit assigns to the entropy coders of the second coding unit the prediction error values for the plurality of color components, respectively, and
the plurality of entropy coders perform the entropy coding on the assigned prediction error values concurrently.

5. A coding apparatus comprising:
a predicting unit that generates a piece of prediction data based on each piece of pixel data constituting a color image;
an intermediate-code generating unit that compares each piece of prediction data with the corresponding piece of pixel data, to generate an intermediate code in accordance with whether or not a difference between each piece of prediction data and the corresponding piece of pixel data is in a range;
a first coding unit that performs entropy coding on the intermediate code generated by the intermediate-code generating unit; and
a second coding unit that performs entropy coding on the intermediate code generated by the intermediate-code generating unit, wherein:
when the difference between each piece of prediction data and the corresponding piece of pixel data is in the range, the intermediate-code generating unit assigns to the first coding unit coincidence information indicating that prediction of the corresponding piece of pixel data is true,
when the difference between each piece of prediction data and the corresponding piece of pixel data is out of the range, the intermediate-code generating unit assigns to the first coding unit literal information indicating that the prediction of the corresponding piece of pixel data is false and assigns to the second coding unit prediction error values for the plurality of color components,
the first coding unit performs the entropy coding on the coincidence information and the literal information assigned by the intermediate-code generating unit, and
the second coding unit performs the entropy coding on the prediction error values assigned by the intermediate-code generating unit.

6. A coding apparatus comprising:
an intermediate-code generating unit that generates intermediate codes as entropy-coding-process targets from an input color image;
a first coding unit that performs entropy coding on a first intermediate code, which is common to a plurality of color components of one and the same pixel, among the intermediate codes generated by the intermediate-code generating unit, to generate a single code corresponding to the first intermediate code for the plurality of color components of the pixel; and
a second coding unit that performs the entropy coding on second intermediate codes unique to the color components, among the intermediate codes generated by the intermediate-code generating unit.

7. The apparatus according to claim 6, wherein:
the intermediate-code generating unit predicts pixel values of the respective color components to generate coincidence information indicating whether or not prediction is true and the pixel values of the respective color components as the intermediate codes, the first coding unit performs the entropy coding on the coincidence information generated by the intermediate-code generating unit, and the second coding unit performs the entropy coding on the pixel values of the respective color components generated by the intermediate-code generating unit.

8. The apparatus according to claim 6, wherein:

the intermediate-code generating unit predicts pixel values of the respective color components to generate coincidence information indicating whether or not prediction is true and prediction error values of the respective color components as the intermediate codes, the first coding unit codes the coincidence information generated by the intermediate-code generating unit, and the second coding unit codes the prediction error values of the respective color components generated by the intermediate-code generating unit.

9. A decoding apparatus for decoding code data of a color image generated by a predictive coding process, the decoding apparatus comprising:

a first decoding unit that decodes a code common to a plurality of color components among input code data, to generate an intermediate code common to the plurality of color components;

a second decoding unit that decodes a unique code unique to a given color component among the input code data, to generate an intermediate code unique to the color component; and an image generating unit that generates image data of the given color component from the intermediate code decoded by the first decoding unit and the intermediate code decoded by the second decoding unit.

10. A coding method using a plurality of entropy coders, the coding method comprising:

generating a piece of prediction data based on each piece of pixel data constituting a color image;

comparing each piece of prediction data with the corresponding piece of pixel data, to generate an intermediate code in accordance with whether or not a difference between each piece of prediction data and the corresponding piece of pixel data is in a predetermined range; and assigning each generated intermediate code to any of the plurality of entropy coders in accordance with whether or not the difference between the corresponding piece of prediction data and the corresponding piece of pixel data is in the predetermined range.

11. A decoding method comprising:

among input code data, assigning a code common to a plurality of color components to a first entropy decoder, to generate an intermediate code common to the plurality of color components;

among the input code data, assigning a unique code unique to a given color component to a second entropy decoder, to generate an intermediate code unique to the color component; and generating image data of the given color component using the intermediate codes decoded by the first entropy decoder and the second entropy decoder.

12. A computer readable medium storing a program causing a computer to execute a process for encoding a color image, the process comprising:

generating a piece of prediction data based on each piece of pixel data constituting the color image;

comparing each piece of prediction data with the corresponding piece of pixel data, to generating an intermediate code in accordance with whether or not a difference between each piece of prediction data and the corresponding piece of pixel data is in a predetermined range; and assigning each generated intermediate code to any of the plurality of entropy coders in accordance with whether or not the difference between the corresponding piece of prediction data and the corresponding piece of pixel data is in the predetermined range.

* * * * *